Dec. 25, 1956    F. A. HOWARD    2,775,092
MECHANICAL CALENDAR

Filed July 24, 1952.    8 Sheets-Sheet 1

INVENTOR.
FRANK A. HOWARD
BY
Kenyon & Kenyon
ATTORNEYS

Dec. 25, 1956     F. A. HOWARD     2,775,092
MECHANICAL CALENDAR

Filed July 24, 1952     8 Sheets-Sheet 2

INVENTOR.
FRANK A. HOWARD
BY
Kenyon & Kenyon
ATTORNEYS

Dec. 25, 1956   F. A. HOWARD   2,775,092
MECHANICAL CALENDAR
Filed July 24, 1952   8 Sheets-Sheet 3
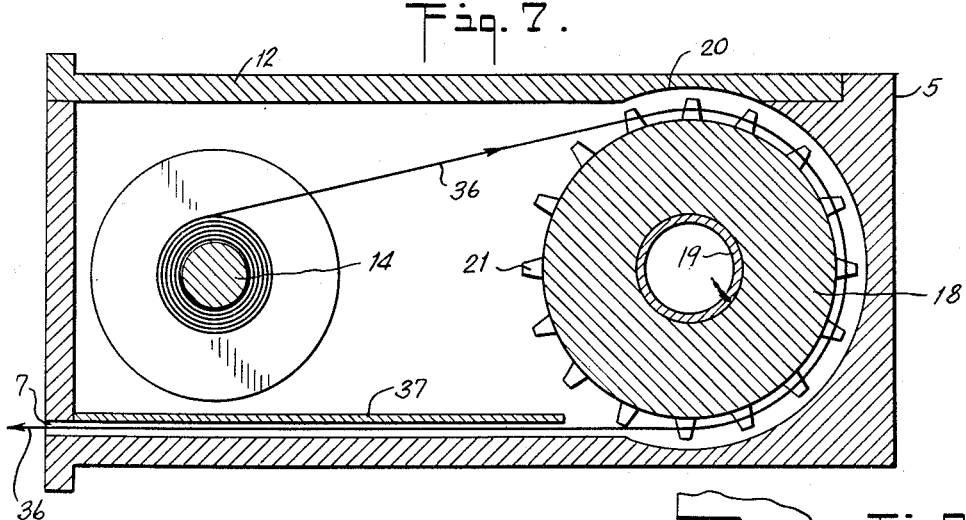
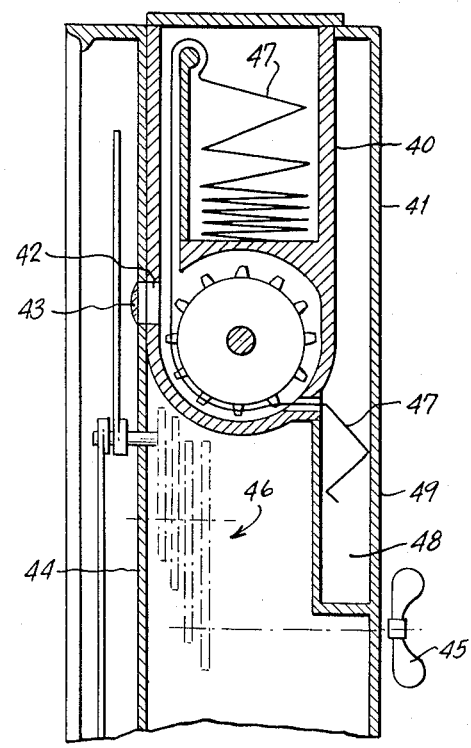
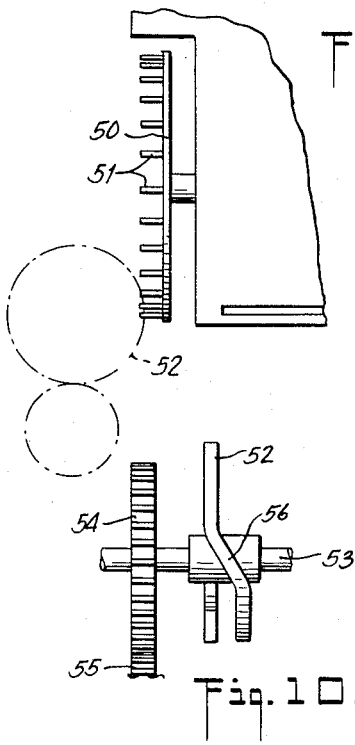
INVENTOR.
FRANK A. HOWARD
BY
Kenyon & Kenyon
ATTORNEYS.

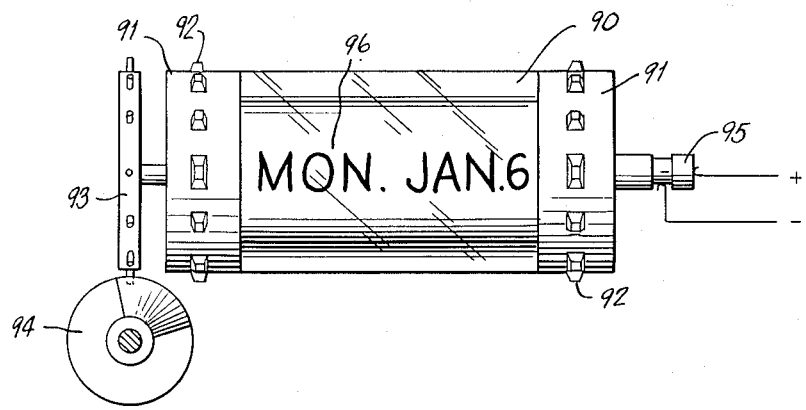
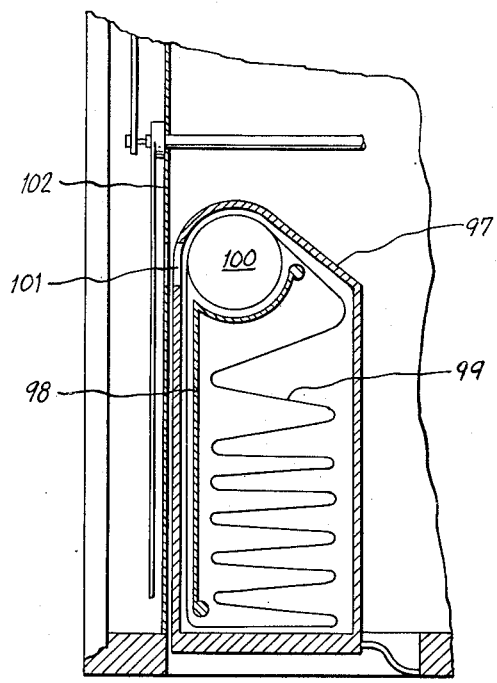

Dec. 25, 1956  F. A. HOWARD  2,775,092
MECHANICAL CALENDAR
Filed July 24, 1952  8 Sheets-Sheet 5
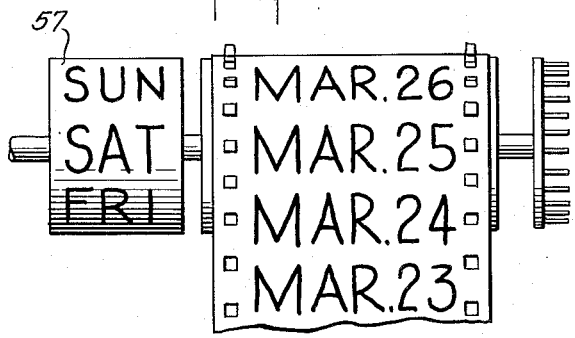
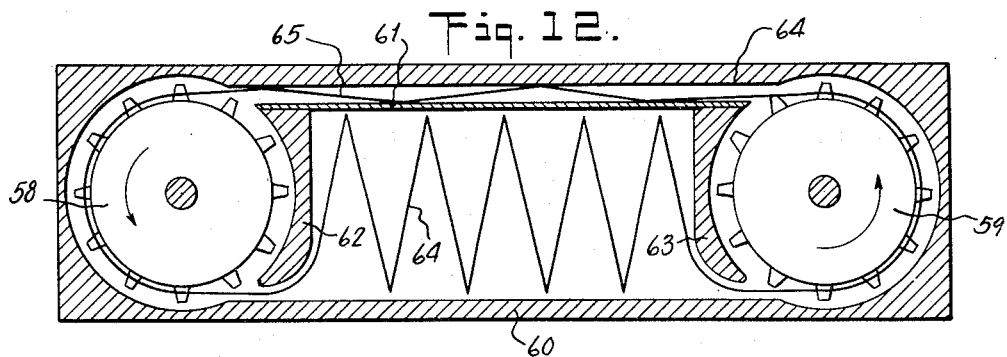
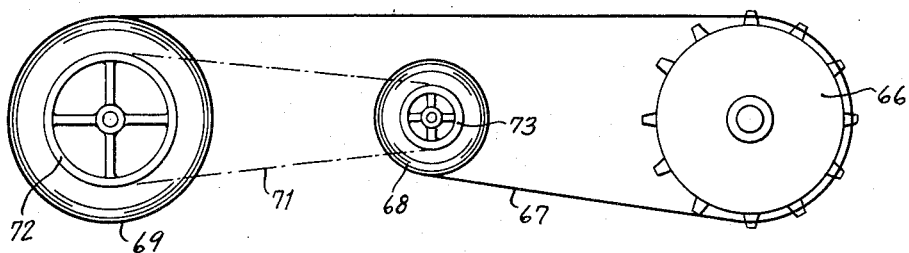
INVENTOR.
FRANK A. HOWARD
BY
Kenyon & Kenyon
ATTORNEYS

INVENTOR.
FRANK A. HOWARD
BY
ATTORNEYS

Dec. 25, 1956     F. A. HOWARD     2,775,092

MECHANICAL CALENDAR

Filed July 24, 1952     8 Sheets-Sheet 7

INVENTOR.
FRANK A. HOWARD
BY

ATTORNEYS

Dec. 25, 1956  F. A. HOWARD  2,775,092
MECHANICAL CALENDAR
Filed July 24, 1952  8 Sheets-Sheet 8
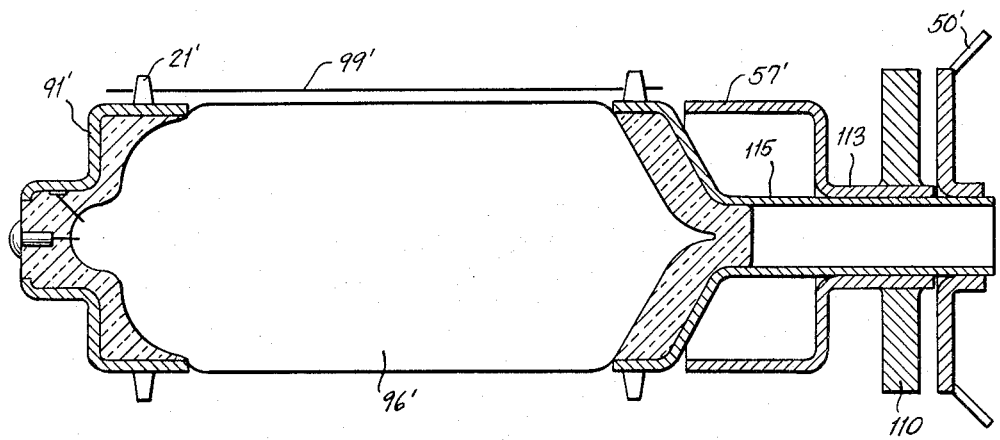
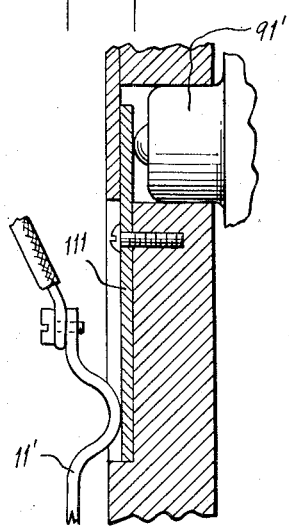
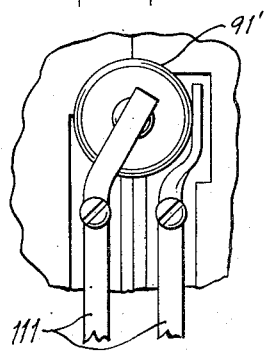
INVENTOR.
FRANK A. HOWARD
BY
Kenyon & Kenyon
ATTORNEYS

United States Patent Office

2,775,092
Patented Dec. 25, 1956

---

2,775,092

MECHANICAL CALENDAR

Frank A. Howard, New York, N. Y.

Application July 24, 1952, Serial No. 300,726

4 Claims. (Cl. 58—6)

My invention relates to improvements in mechanical calendars and more particularly to an independent, and manually removable, unitary calendar capsule which is adapted to telescope within the case of a clock, the capsule being of generally prismatic form and carrying an exposed movable calendar legend on a rotating element at its inner end. When the capsule is inserted in the clock, the exposed legend lies back of and parallel with the clock face so that it may be read through an aperture in the face. The outer end of the capsule may then be substantially coincident with another surface of the clock case, such as the back of the clock or the top or bottom of the clock. The clock itself is provided with means forming a part of its own mechanism for causing the rotating element of the calendar to be driven coincidently with daily motions of the clock mechanism. These operating means do not affect the operation of the clock and are entirely independent of the capsule, and become operative on the capsule only by reason of the juxtaposition of the two when the capsule is inserted. To set or adjust the calendar to the proper date, or to renew the calendar tape, if that form of the device is used, the capsule is bodily removed from the clock case by merely withdrawing it. Many different types of calendar mechanism and designs may be offered as alternatives, all forms being included in interchangeable capsules which may be sold separately for use in the same clocks.

The invention will be fully understood from the following specifications taken in connection with the accompanying drawings in which Figure 1 is a face view of an electric clock fitted with a calendar capsule, Figure 2 is a diagrammatic cross sectional view of the clock showing the position of the capsule, Figure 3 is a fragmentary view of the back of the clock showing the exposed end of the capsule, Figure 4 is a longitudinal section through the center of the capsule case, the electrical connections being indicated diagrammatically only, Figure 5 is a side view of the case shown in Figure 4, broken away at the outside corner to show the channel through which the calendar strip or tape is ejected from the capsule, Figure 6 is an enlarged fragmentary side view, partly in cross section, of the bimetallic spiral thermoelectric actuator for the feed roll, Figure 7 is an enlarged longitudinal section through the capsule taken in the plane of the teeth which feed the calendar tape, Figure 8 is a simplified section through a spring type of clock showing a concertina-folded calendar tape used in a vertical form of calendar capsule, Figure 9 is a fragmentary view of the end of the calendar capsule shown in Figure 8, and Figure 10 is a fragmentary detail of the cam actuating device and its drive, Figure 10a is an elevation of a neon tube feed roll, Figure 11 is a face view of the exposed calendar legends on a calendar capsule of the perpetual calendar type which combines a week day wheel with a calendar tape bearing legends for each month day of the year, Figure 12 is a longitudinal section through the calendar tape portion of the capsule shown in Figure 11, indicating the method in which the endless calendar tape is stored in the center of the capsule between the feed wheel and the return wheel, Figure 12a is a fragmentary section showing diagrammatically a bottom-inserted capsule of the endless tape calendar type, Figure 13 is a diagram of a capsule containing a take-up roll, Figure 14 is a cross section in the other plane of the capsule shown diagrammatically in Figure 13, Figure 15 is a face view similar to Figure 11 showing a form of calendar capsule in which all of the calendar legends are carried on wheels or drums which are actuated by back-gear trains located in the rear portion of the capsule, as shown in Figure 16 which is a longitudinal diagrammatic section showing the location of the back-gear trains which actuate the month day legend wheels.

Figure 20 is an enlarged longitudinal section through a feed roll, the body of which consists of a light bulb or tube, as indicated in Figure 10a of the original drawings.

Figure 21 is an enlarged fragmentary section through the case of the capsule showing the method by which the electric current is supplied to the central terminal of the neon tube electric light bulb.

Figure 22 is an enlarged fragmentary end view showing both electric connections.

Figure 1:
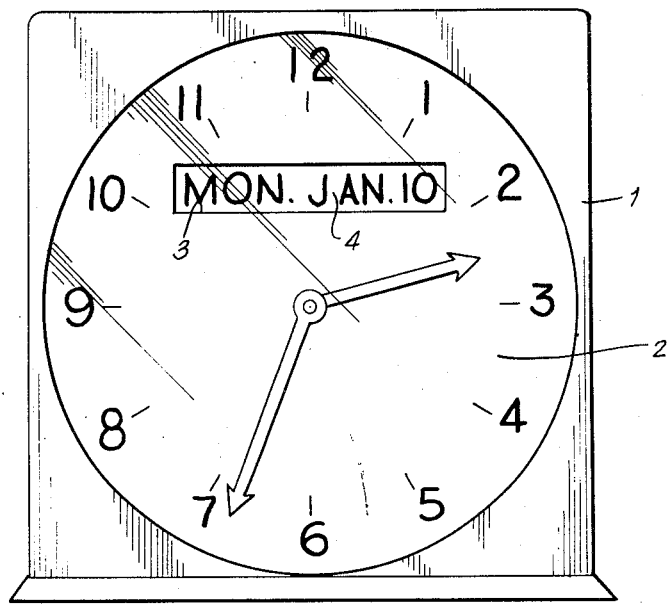

Referring first to Figure 1 of the drawings, the numeral 1 indicates a rectangular clock case for an electric clock, the face of which is designated 2. In the upper portion of the clock face there is a rectangular aperture 3 through which there is visible the calendar legend 4.

Figure 2:
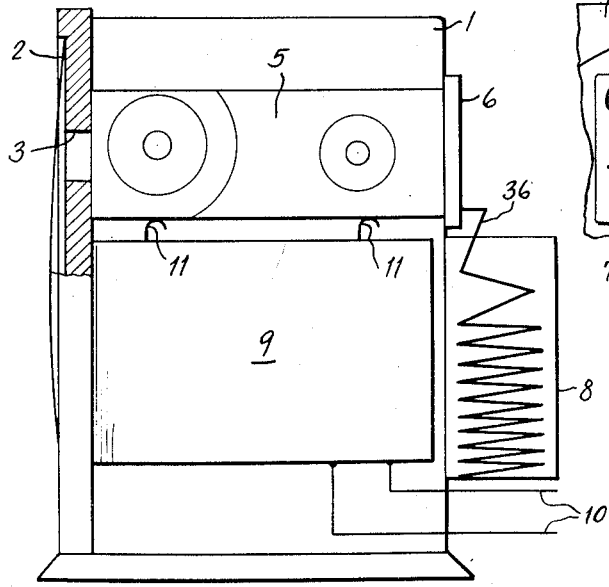
Figure 3:
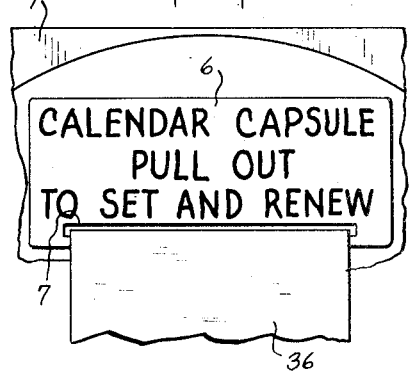

The calendar capsule itself comprises a unitary rectangular prismatic case 5 which, as shown in Figure 2, extends through the depth of the clock from back to front. It is supported on suitable guides in the clock case, the showing of which is omitted for simplicity. The rear end of the calendar capsule designated 6 is substantially flush with the rear face of the clock but may be grasped by the fingers in order to pull out the calendar capsule. Preferably this exposed rear face will carry a legend, as shown in Figure 3, reading "Calendar capsule, pull out to set and renew." In the form of calendar capsule shown in these Figures 1 to 3, there is used a calendar strip or tape bearing 365 (or for leap year 366) plainly printed legends 4 which may be in turn brought into position back of the aperture 3 in the face 2 of the clock. The calendar tape is ejected from the back of the capsule, by means which will be later described, through a slot 7 and may be torn off from time to time or may be stored for convenience in a waste compartment 8 hung on the back of the clock, as shown in Figure 2. The clock shown diagrammatically in Figures 1 to 3 is of the common electric type, the synchronous driving motor and gears all being enclosed within the case 9 to which the alternating electric current is supplied by wires 10. The clock movement embodied within the case 9 includes a pair of contacts, not shown, which, once in each twenty-four hours, transmit the electric current to the two sliding contact springs 11, shown in Figure 2, bearing against the bottom of the calendar capsule case 5.

Figure 4:
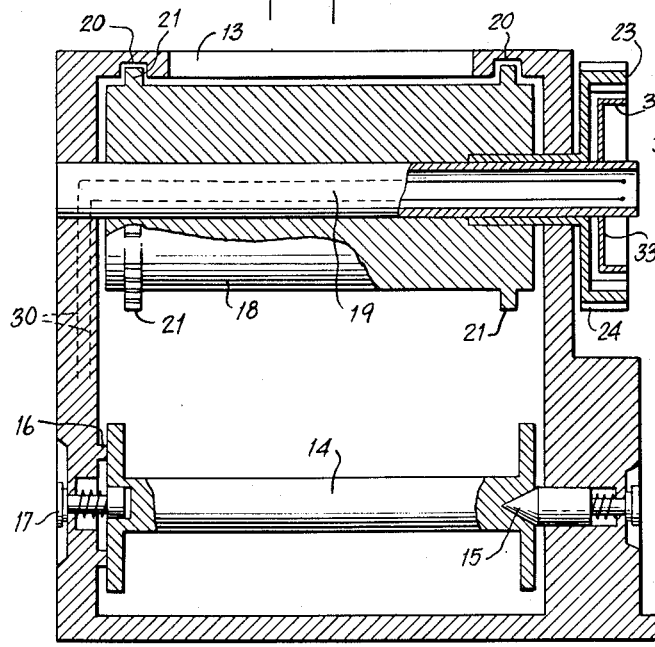

One construction of the calendar capsule is shown in further detail in Figures 4 to 7. In this form the case itself may be a plastic molded rectangular prismatic box, having a removable cover 12. At the front end of the box there is a rectangular aperture 13 which registers with the aperture 3 in the face of the clock when the capsule is in position within the clock. The calendar tape is carried on a magazine roll 14 in the rear portion of the capsule. On one end the magazine roll is supported by a pointed spring plunger 15 which presses the magazine roll into friction contact with a circular rib 16 on the opposite face of the capsule in order to provide a friction drag or brake to hold the roll 14 stationary when it is not positively actuated. This end of the roll is supported by a cylindrical spring plunger 17 and the roll may be removed, when the cover 12 is off of the capsule, by withdrawing the spring plungers 16 and 17. The feed roll, shown in cross section in Figure 4, is a solid roll, designated 18, which is journaled on a stationary shaft 19 fixed in the case 5 at the left end. The front end of the case 5 is molded to conform to the shape of the roll and is also molded with two channels 20 to receive the feed teeth 21 which are arranged on the surface of the roll. At its right end, the feed roll 18 is fixed to a short bushing 22 which extends out through the right end of the case and carries on its projecting end the feed wheel 23. As shown in Figure 4, the wheel is of flanged construction. The outer periphery of the flange carries ratchet teeth 24 which are engaged by the spring pawl 25 mounted on the removable cover 12 of the case. The purpose of this ratcheting pawl is to prevent the feed roller from being pulled backwards by the thermoelectric actuator on the return stroke of the latter. The actuator comprises a bimetallic spiral made of two metal strips, affixed at their inner ends to the projecting end of the shaft 19, bent into a spiral form and secured together at their outer ends by a block 26. The inner member of the bimetallic spiral may be constructed of a metal such as steel or bronze alloy with a relatively high coefficient of thermal expansion, whereas the outer member may be constructed of a metal with a relatively low coefficient of expansion, such as Invar. The bimetallic spiral is wound with a thermally and electrically insulated heating wire, designated 29, which may be grounded to the block 26 at the outer end so that the bimetallic spring itself forms the return circuit. The electric connections for this thermoelectric actuator are shown diagrammatically in Figure 4 and comprise longitudinal contact members 30 exposed on the lower edge of the case 5 to come into contact respectively with the two spring sliding contacts 11 (Figure 2) and conductors extending through the fixed shaft 19 to carry the current from these sliding contacts to the heating wire 29. The block 26 which joins the two free ends of the bimetallic spiral is shaped as a pawl to engage the teeth 31 of the inner face of the flange of the wheel 23. The motion of the block 26 is limited by a flange 32 on a stationary disk 33 fixed to the projecting end the stationary shaft 19. This flange 32 is interrupted, at a point opposite the location of the pawl or block 26, through an angle wide enough to permit the pawl itself to move through an angle which corresponds to the distance from one legend to the next legend on the calendar tape.

Figure 6:
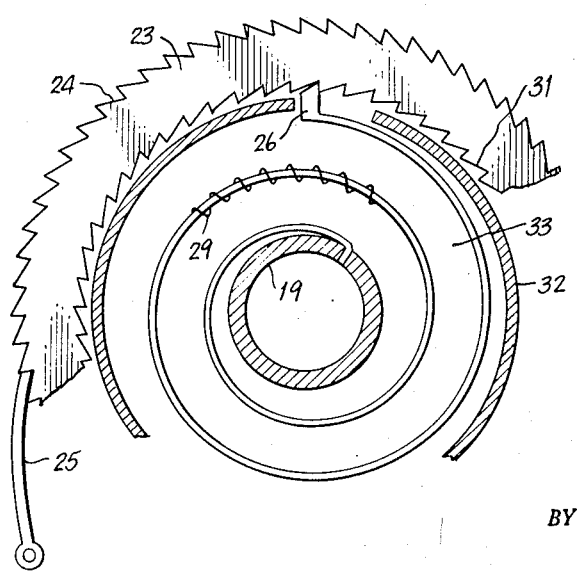

In place of the construction shown in Figure 6, there may be used an alternative form of thermoelectric actuator in which both of the spiral metal strips are of the same metal. The heating wire 29 is then wound around the inner strip only however.

Figure 5:
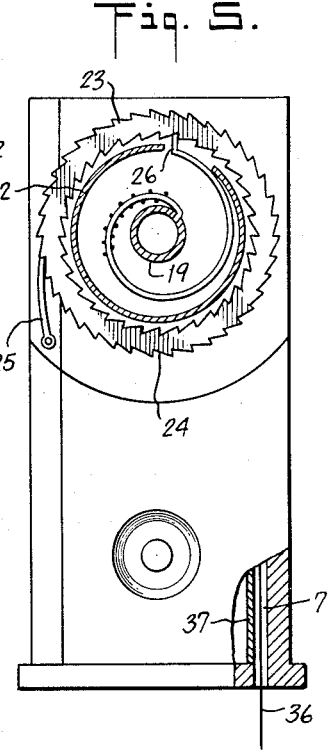

The operation of the devices shown in Figures 1 to 6 and described above is as follows: A magazine roll 14 carrying a calendar tape, designated 36 in Figure 2, Figure 5 and Figure 7, is inserted in the case of the capsule, the cover of the case being removed to permit insertion of the roll. The calendar tape may be conveniently made of a good grade of paper and is provided with two rows of perforations, not shown, adjacent its margins. The free end of the calendar tape is passed over the feed roller 18 manually, the teeth 21 of the feed roll meshing with the perforations in the margins of the tape. At the bottom of the case the tape passes beneath a metal plate 37 (Figures 5 and 7) which forms a false bottom for the case 5. Rotation of the feed wheel 18 by hand pushes the tape out through this false bottom until it emerges from the back end of the capsule through the slot 7, as shown in Figure 5 and also in Figure 2. The cover is now put on the case and the case inserted through the back of the clock to come into the final position shown diagrammatically in Figure 2. In this position the two diagrammatically indicated conductors 30 on the lower margin of the case form contact respectively with the two bent contact springs 11.

Through the operation of the time mechanism of the clock, not shown and not in itself forming any part of the present invention, the contacts 11 are energized with the alternating electric current, which operates the clock, at some suitable period during the day, for example at midnight. When the contacts 11 are thus energized, the current is passed through the diagrammatically shown connections to the heating wire 29 wound around the bimetallic thermoelectric actuator. As the two spirally wound strips forming this actuator are heated, the inner strip expands faster than the outer, thus causing the spiral to tend to unwind. This action moves the pawl-block 26 from the position shown in Figure 6 through the angle permitted by the interrupted flange 32. In this motion the pawl-block 26 advances the feed wheel through an angular interval corresponding to the angular interval of one legend 4 on the calendar tape 36. The same length of tape is thus ejected through the slot 7 in the back of the case and may be torn off from time to time or caught in the waste receptacle 8 on the back of the case. Because of its inherent nature the thermoelectric actuator moves silently, and slowly but positively and is thus an especially suitable actuating device for the feed roll. The contacts 11 must remain energized for a sufficient length of time to cause the expansion of the bimetallic spiral, but this need not be more than about one minute. There is nothing critical about this time, however, provided it is long enough to insure heating of the spiral, and the contacts 11 may remain energized for an indefinitely longer period without effecting the operation. Ultimately, however, the contacts will be de-energized by the clock mechanism and at that time the spiral begins to cool and return to its original shape shown in Figure 6. Here again the limit of motion of the pawl 26 is fixed by the edge of the interrupted flange 32. The spiral is constructed to have an approximate expansion somewhat greater than required, but the exact amount of expansion and contraction for each thermal cycle is not critical since the limits of motion of the pawl 26 are fixed and any further expansion or contraction of the spiral serves to deform the intermediate portion of the spiral curve without moving the pawl 26. During the return motion of the pawl 26, coincident with the cooling of the spiral, it slips over the ratchet teeth and would thus tend to drag the feed roller backwards. This backward motion of the feed roller is prevented by the spring-pawl 25, shown in Figures 5 and 6, which engages the external teeth 24.

From time to time the accumulated length of the rejected calendar tape in the waste receptacle 8 may be torn off. At the end of the calendar year the capsule is manually removed from the clock by sliding it out of the clock case and the magazine roll 14 is then replaced with a new magazine roll carrying a calendar tape for the ensuing year.

Both the clocks and the calendar capsule may be sold and put into service at various times during the course of the year and the operation of the clock may also be interrupted at any time during the course of the year for indefinite periods. These two problems create the need for convenient unskilled adjustment of the calendar to bring it up to date. By the design shown all such adjustments may be carried out with the maximum of convenience and a minimum of skill and experience. The calendar capsule itself may be purchased separately or together with the clock, and it may be manually removed from the clock at any time without effecting in any way the operation of the clock. When the lid is removed from the capsule case the feed roll 18 may be advanced manually to bring the appropriate legend into registry with the aperture 13. This may be done either by pulling on the emergent portion of the calendar tape 36, or by manually rotating the feed roll 18. The magazine roll 14 moves only in response to tension of the calendar tape because of the friction brake applied to its left end, as shown in Figure 4, by the circular rib 16. When the correct calendar legend is visible through the front aperture 13 of the case, the case is inserted in the clock and by the means described the calendar tape thereafter advances daily by motion of the thermoelectric actuator.

In Figure 8 I have shown another form of calendar capsule, the case of which is designated 40, mounted vertically through the top of a clock case 41. Here the aperture in the case through which the calender legend may be read is indicated at 42 and is on the top of the capsule case rather than at the end of the case. The aperture 42 registers with a magnifying prism 43 inserted in the registering aperture of the clock face 44. The clock shown in Figure 8 is an ordinary mechanical clock, the main spring of which is wound by a wing nut 45 on the back of the clock. The clock works are indicated only diagrammatically at 46. The case 40 of the calendar capsule, shown in Figure 8, carries a calender tape 47 in the form of a folded pack, the folds of which are of the concertina type, as indicated in Figure 8. This calendar tape 47 is ejected from a slot in the back face of the case 40 and may be stored in a waste compartment 48 formed within the clock itself between the back face 49 of the case and a partition wall.

In place of the thermoelectric actuator previously described, I may employ a wholly mechanical actuator for the feed roll of the calendar capsule. This actuation means is shown diagrammatically in Figures 9 and 10. The projecting end of the shaft of the feed roll is equipped with a crown gear 50. When the calendar capsule is inserted within the case the crown gear pin teeth 51 mesh with a warped disk cam 52 mounted on a shaft 53 which is turned by a gear wheel 54 once in each 24 hours. The gear wheel 54 meshes with a pinion 55 which turns once in each 12 hours and may, therefore, be mounted rigidly on the hour-hand shaft of the clock. The disk cam 52 which engages the teeth 51 of the crown wheel may have only a relatively short warped portion 56, as shown in Figure 10, so that the entire daily motion of the feed roll takes place within a short period, say between 12:00 midnight and 5:00 a. m. By the use of the magnifying prism 43, it is possible to use smaller print on the legends of the calendar tape and at the same time make them easily visible. The operation of the devices shown in Figures 8, 9 and 10 will be in the main clear from the above description of its construction. The calendar tape 47 in the concertina-folded pack may be long enough for a period of two years or more, rather than one year, and is renewable at a minimum of cost and a maximum of convenience. Through the driving mechanism shown in Figures 9 and 10, the feed roll is locked in position by the driving cam itself so that it cannot turn save at the time and to the extent to function as a calendar. When the capsule case 40 is removed from the clock, however, the feed roll is entirely free and may be rotated by hand to set the calendar tape for the proper date.

In Figure 11 I have shown an end view of the feed roll of an alternative form of calendar capsule intended for use as a perpetual calendar, and in Figure 12 I have shown further modifications of the capsule for this purpose. Turning first to Figure 11, the feed roll at the front end of the capsule is constructed and operated as heretofore except that it occupies only a part of the width of the case sufficient to display the month and month-day legend, as shown in Figure 11. Beyond this section the roll carries on its shaft an adjustable week-day wheel 57 which normally turns with the feed roll, being fixed on it with a relatively tight friction fit, but which may be manually turned on the shaft of the feed roll by moderate force. This week-day wheel 57 carries seven legends arranged at equal angles or intervals corresponding to the angular width of the month-day legends on the calendar tape, all as shown in Figure 11. In Figure 12 the calendar roll, here designated 58, occupies the customary position at the front end of the case of the capsule and there is a similar return roll 59 mounted in the rear end of the calendar capsule. The bottom of the calendar capsule is designated 60. There is a metal plate 61 forming a false top for the calendar capsule. Curved partition members 62 and 63, which clear the bottom 60, form a storage compartment in which there may be accumulated the necessary length of calendar tape, for example 100 to 400 inches. The accumulation is permitted by folding the calendar tape, here designated 64, in the concertina form, as shown in Figure 12. If the calendar tape is formed of material having some rigidity, as for example a stiff paper, plastic film, or a very thin metal sheet, the concertina folds tend to persist and aid in the orderly self-arrangement of the stored length of tape within the storage compartment. The operation of the form of calendar shown in Figures 11 and 12 is as follows: The feed roll 58 is actuated either mechanically or electrically as heretofore described. The teeth of the feed roll engage the perforations near the margins of the calendar tape 64 and pull the tape forward through the compartment formed between the top of the case and the partition 61. The return roller 59 will have a moderate frictional resistance which may be provided in the same manner as shown in connection with the magazine roller 14 of Figure 4. This resistance will keep the upper portion of the calendar tape 64 in tension. In order to indicate the tendency of the concertina folds to persist, I have, however, shown in an exaggerated manner the persistence of such folds at 65 in the upper portion of the calendar tape. After advancing over the feed roll 58, the calendar tape is discharged under the curved partition 62 into the storage compartment where it tends to again assume the concertina form. In this way it is possible to store the necessary length of loose calendar tape within a storage compartment of moderate size. The return roll 59 which carries the same teeth as the feed roll 58, and is otherwise of similar construction, is turned only by the belt action of the calendar tape itself with the force provided by the feed roll 58. As the roll 59 turns, the teeth on its surface engage the perforations and withdraw the stored calendar tape 64 from the storage compartment. For the proper functioning of the calendar tape in this and other forms of capsule, it is especially desirable to have close fits between the surface of the feed roll and the end of the case, the clearance being just sufficient to permit the tape to move freely. By reference to Figure 7, it will be shown that the necessary close fit may be provided by having grooves 20 in which the relatively long teeth 21 of the feed roll move. This same construction may be employed for both the feed roll 58 and return roll 59 shown in Figure 12. This construction also permits the use of a paper calendar tape without perforations since the teeth themselves will perforate the tape and provide a positive feed. This unperforated tape is especially cheap and suitable for sale as an annual or biennial renewal calendar pack for the concertina-folded form of clendar pack shown at 47 in Figure 8. The perpetual calendar device shown in Figures 11 and 12 preferably uses a perforated tape however, and may operate indefinitely without adjustment save for leap years. On leap year day the calendar capsule must be removed from the clock case and manually set backward one day. The week-day wheel at the same time is set forward one day by forcibly turning it on the shaft of the feed roll.

Figure 14:
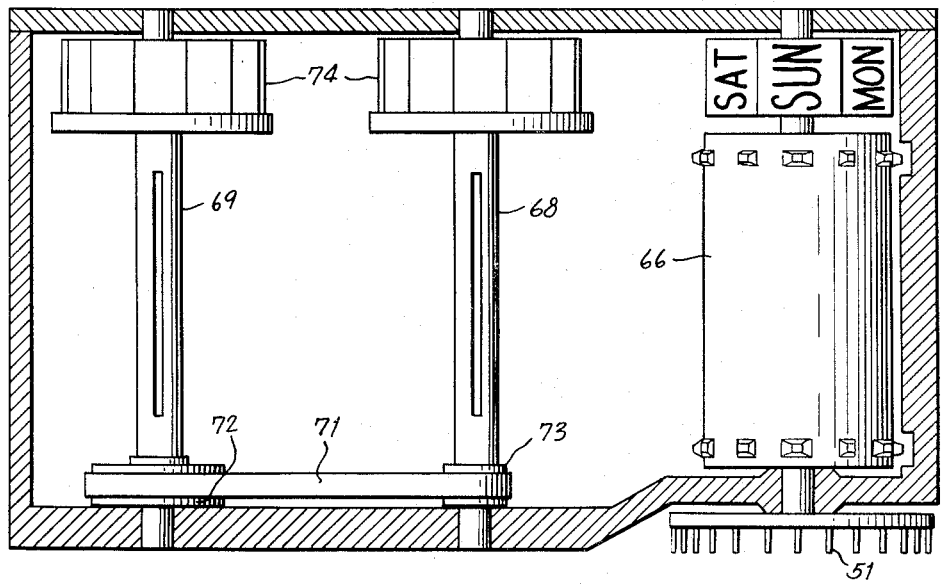

In Figures 13 and 14 I have shown another form of perpetual calendar capsule which requires rewinding of the calendar tape at the end of each year, in addition to the manual setting on leap year day above described. Here the feed roll, designated 66, is of the same construction described in connection with Figure 12. In place of storing the calendar tape, designated 67 in Fig. 13, in concertina folds in the center of the capsule, it may be stored on a take-up roll 68 mounted in the center of the capsule. Initially the calendar tape 67 is wound on a magazine roll 69 at the rear end of the capsule. As it passes over the feed roll 66 the feed end is taken up by the roll 68. To accomplish this result, the roll 68 must be driven mechanically. Such a drive is provided by a belt 71 mounted on a large belt pulley 72 carried by the magazine roll 69 and a small belt pulley 73 carried on the take-up roll 68.

The surfaces of the magazine and take-up rolls lying on the ends behind the week-day wheel may be of the full diameter of the feed roll and corrugated as shown at 74, so that these magazine and take-up rolls may be readily operated by hand to set the calendar tape in the correct position at any date and to rewind the tape on the magazine roll. Because the feed roll 66 advances the calendar tape at a linearly constant rate the take-up roll 68 must be driven a variable speed with relation to the feed roll. This is accomplished by the construction described. The ratio of the diameter of the pulleys 72 and 73 is such as to drive the take-up roll 68 at the maximum speed required to take up the calendar tape when the take-up roll is of minimum diameter. As the effective diameter of the take-up roll increases the belt 71 slips more and more. When the top of the case is removed for manually setting or rewinding, the calendar tape may be kept taut between the magazine and take-up rolls by manual pressure on the corrugated surfaces 74, without regard to the slipping of the interconnecting belt 71.

Figure 15:
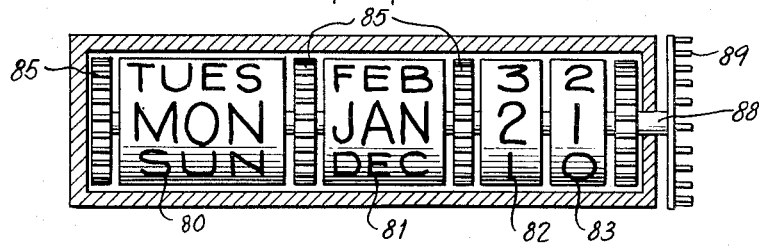
Figure 16:
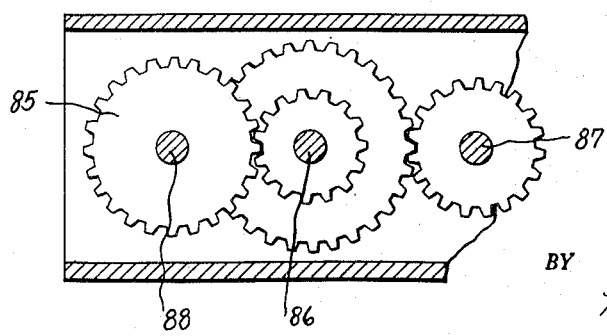

In Figures 15 and 16 I have shown another form of the calendar capsule in which the calendar legends for the week days, the months, and the month days are carried on separate wheels or drums all mounted on the shaft of the feed roll at the front of the case, as heretofore described. In this embodiment of the invention the various moveable wheels designated 80 for the week-day wheel, 81 for the month wheel, and 82 and 83 for the month-day wheels, are all geared together through gears 85 affixed to the respective wheels and meshing with the back-gear train mounted on shafts 86 and 87 lying behind the main shaft 88 which replaces the feed roll shaft used in the other forms of the invention.

Since the details of the gearing mechanisms causing the wheels 80, 81, 82 and 83 to operate in the predetermined fashion as a perpetual calendar form no part of the present invention, I have not shown the details of this gearing. The main shaft 88 will, however, be operated by a crown wheel 89 or by a thermoelectric actuator, as previously described, to turn the main shaft 88, so that in respect to its general conformation and arrangement, and its relation to the clock, the device shown in Figures 15 and 16 corresponds to that shown in the earlier figures. It should also be noted that since the capsule in its entirety may be manually removed from the clock at any time, it is not necessary to provide special means for resetting the calendar wheels 80, 81, 82 and 83 from the exterior of the clock. These wheels may be manually reset when the capsule is removed. It will also be noted that the different forms of capsule shown in all of the figures of the drawings are or may be interchangeable in their relation to the clock. Relatively cheap or relatively expensive forms of calendar capsules embodying more or less mechanical complication may, therefore, be fitted interchangeably into the same clock.

In Figure 10a I have shown a feed roller, designated 90, in the form of a glass cylinder neon light tube, equipped with metal or plastic end sections 91 which are substantially flush with the surface of the cylinder and carry the teeth 92 which engage the perforations in the calendar tape. One end section carries a pinion 93, the projecting teeth of which engage the warped disk cam 94 when the capsule is inserted in the clock. The other end section 91 carries a stub shaft 95 which is provided with electrical contacts to energize the neon tube and cause it to light up. These contacts may be connected with the electrical leads of an electric type clock through stationary contact bars 30, of the form shown diagrammatically in Figure 4 and Figure 2.

The neon-light form of feed roller shown in Figure 10a may be used in combination with a transparent or translucent calendar tape to illuminate the field of the calendar legend, designated 96 in Figure 10a, by transmitted light. For simplicity, the entire legend is shown as applied directly to the tube in Figure 10a, and it may be so applied in the case of the week-day legend of a composite roller of the type shown in Figure 11 and previously described.

In Figure 12a I have shown a simplified form of bottom-inserted capsule designated 97 equipped with an internal partition 98 which forms a large storage compartment for the tape 99. The feed roller 100, which may be designed and constructed as shown in other views, draws the tape 99 upward through a channel between the partition 98 and the adjacent wall of the capsule. The tape moves past the exposure aperture 101 in the capsule, which registers with the transverse visual opening in the clock face 102 when the capsule is in operative position. As it feeds off of the back portion of the roller 100, the tape 99 discharges into the storage compartment where it may accumulate either in random fashion or, if previously folded in concertina-type folds, it will tend to resume this form. The tape 99 is shown as an endless tape, which might be used with a type of roller 100 carrying an end section with an adjustable week-day wheel, as shown in Figure 11. This same form of capsule 97 may be used however with a complete calendar tape carrying the entire legend, as shown in Figures 1 to 8. In that case the calendar tape 99 will be supplied in a concertina-folded pack printed for one or more consecutive years and inserted in the capsule 97 upside down to feed from the bottom, as shown in Figure 12a, the tape feeding off the back of the roll 100 when accumulating above the pack in the same storage compartment, as will be clear from Figure 12a.

It will be understood that the length of folds used in a concertina-folded calendar tape or pack is not limited, whether the tape be of the endless type shown in Figures 12 and 12a, or of the double-ended type shown in Figure 8. In either case the dimensions of the capsule and the size of print on the legends may require the tape to be folded between every two or three consecutive legends or only between ten or more consecutive legends.

Figure 17:
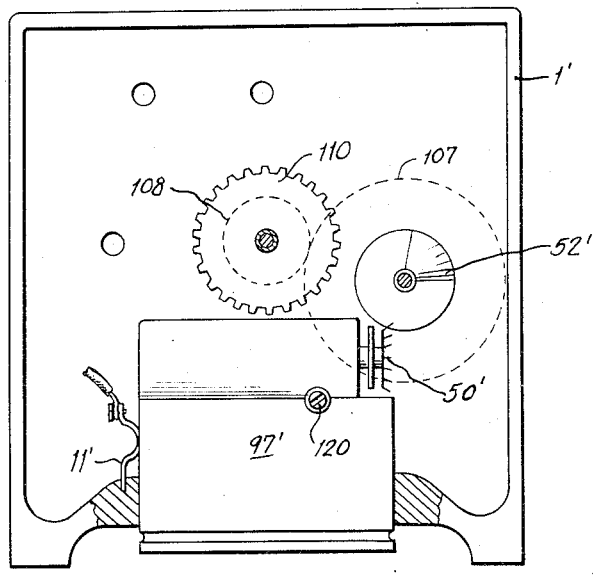
Figure 17 is a cross section through the front portion of a common form of electric clock looking toward the rear side of the clock face. This sketch shows the preferred construction in which the calendar capsule is inserted through the bottom of the clock case, as shown in Figure 12a of the drawings.
Figure 18:
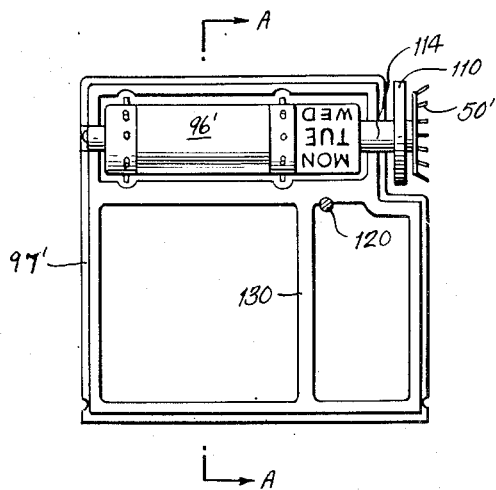
Figure 18 is an enlarged transverse section through the calendar capsule of Figure 17.
Figure 19:
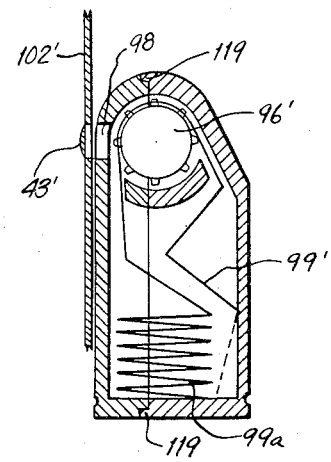
Figure 19 is a section on the line AA of Figure 18 with the zig-zag calendar pack in place.

In Figures 17 to 22 the numeral 1' indicates a rectangular plastic case for an electric clock, the hour-hand wheel which lies against the back of the clock face is designated 110. The plastic case 97' of the calendar capsule is inserted from the bottom of the clock. When inserted it is held in position by electrical contacts 11' which engage depressions in contact strips 111 fastened in grooves in the side of the calendar capsule, as shown in Figures 21 and 22. One of the contact strips 111 bears against the central terminal, whereas the other contact strip bears against the cylindrical face of the metal base 91' of the neon tube roller 96'. The neon tube itself forms the roller over which travels the calendar tape 99'. This tape is in the form of a concertina or zig-zag folded pack; the pack itself in the form in which it is first introduced into the capsule being illustrated at 99a in Figure 19. As will be seen in Figure 19, the zig-zag folded tape feeds off of the top of the pack around the neon tube roller 96' passing in front of the visual opening in the capsule case. When the capsule case is inserted in position in the clock, as shown in Figures 17 and 19, the capsule case lies directly back of the clock face 102' and the visual opening in the clock face may be provided with the magnifying prism 43' so that the legend on the tape is more easily read. After passing around the roller the tape emerges into the large empty space in the capsule lying above the zig-zag pack 99a. In this space the tape has a tendency to resume its zig-zag form, but this is not essential since the space is large enough so that the tape as fed off of the roller will not be unduly crowded. If the zig-zag tape is double ended as shown in Figures 2, 4, 7, 8, 13 and 14, rather than continuous as shown in Figures 12 and 12a, the tape must be threaded onto the roller again after passing completely over it.

Only the month-day legend need be carried by the tape. The week-day legend is carried on a separate metal cylinder 57' shown in section in Figure 20. The cylinder 57' is necked down to a hub 113 which passes over the hub 115 of the roller tube 96'. The inner hub 114 carries a crown wheel 50' with oblique teeth which are radial with respect to the actuating cam 52' (Figure 17) which passes between the teeth. The cam 52' is mounted on the shaft of a 24-hour wheel 107 shown in dotted lines in Figure 17, which is driven by a wheel 108, similarly shown in dotted lines, and which is affixed to the hub of the hour-hand wheel 110 of the clock.

To permit the most convenient assembly of the calendar capsule, it is shown as made up in two halves, the joint being in a transverse plane and rabbeted, as shown at 119 in Figure 19. The two halves are held together with a single screw 120. A thumb wheel 110 on the hub 113 serves to adjust the week-day wheel or drum 57' with reference to the tube 96'. By making a reasonably tight friction fit between the hubs 113 and 114, this manual adjustment will be retained indefinitely. The metal base 91' of the neon tube 96' carries one set of teeth 21', whereas the second set of teeth, if desired, may be provided by a band fastened to the expanded end of the hub 114 and cemented to the tube 96', as shown in Figure 20. The case of the capsule 97' may have an internal rib 130 making a storage compartment beneath the week-day wheel, or shown in Figure 18. This storage compartment may conveniently contain an extra calendar tape.

While I have shown and described many forms and details of my invention in the foregoing specifications, it will be understood that this is for the purpose of making clear the nature and principles thereof, and I do not regard my invention as limited to any particular form or detail save in so far as such limitation may be included within the terms of the following claims in which it is my intention to claim all novelty inherent in the invention as broadly as may be permissible in view of the prior art.

What I claim is:

1. A mechanical calendar capsule comprising a case, having one end curved to semi-cylindrical form and having a circumferential groove in the cylindrical surface, a cylindrical feed roller carried by the case within said curved end, the surface of the roller being spaced from the curved surface of the case by a small interval, the roller having a row of teeth which travel in the said groove, a loose calendar tape of flexible material, and of thickness slightly less than the width of the said space interval, stored within the case and passed over the said roller, the teeth passing through the tape into the said groove and guide surfaces carried by the case for stripping the tape from the roller at the exit side, the said case being partly open in proximity to the roller to expose a complete calendar legend carried by the tape.

2. In combination, clock works enclosed in a clock case bearing a clock face on its front surface and having a visual opening in said surface and a telescoping calendar capsule in the form of a bodily removable unitary structure capable of being inserted in and removed from the clock case through an opening therein, a calendar pack enclosed within the capsule and in the form of a thin tape preformed into a pack from which it may be stripped by pulling on a free end on the outside of the pack, one face of the tape carrying a consecutive calendar legend, the tape having a longitudinal line of equally spaced perforations, said capsule having a visual opening which registers with the first named visual opening and also enclosing a toothed feed roller over which the free end of the tape extends and which engages the perforations at the tape, the feed roller being located so that on rotation it will strip the tape from the pack, draw it past the registering visual openings, and thereafter discharge it outside of the capsule, a calendar actuator carried by the capsule and operatively connected to the roller and connections between the clock works and the actuator for intermittently supplying power to the actuator to cause intermittent fixed motion thereof on predetermined motions of the clock works.

3. A combination in accordance with claim 2 in which the clockworks connection includes a continuously rotating cam in the form of a disk having a relatively short helically-warped edge portion without angular gap, and the calendar actuator is in the form of a toothed wheel, consecutive teeth of which move radially of and always straddle the edge of the said disk cam as the capsule moves into its operative position within the clock case, whereby the capsule may be inserted at any position of the clockworks cam and the actuator is positively locked in position by the disk cam by the act of insertion of the capsule and thereafter slowly rotated by one tooth at intervals by the passage between the teeth of the relatively short warped section of the disk cam.

4. In combination, an electrically operated clockworks enclosed in a clock case bearing a clock face on its front surface and having a visual opening in said face and a second opening in another surface of the case, and a telescoping calendar capsule in the form of a bodily-removable unitary structure capable of being inserted in and removed from the clock case through said second opening, said capsule having a closed end which fills the said second opening in the case when the capsule is inserted, and carrying within itself exposed, movable calendar legends which register with the said visual opening when the capsule is in position within the case and also carrying a calendar actuator which is operatively connected with the movable legends, and connections between the clockworks and the actuator for intermittently supplying power to the actuator on predetermined motions of the clockworks, said connections becoming operative solely by the act of inserting the capsule in the case and without effect on the clockworks or on the calendar actuator, whereby the capsule may be inserted or withdrawn at will without disturbing the operation of the clockworks and without effecting a manual setting of the calendar legends made while the capsule is withdrawn from the clock case, the movable calendar legends being imprinted in opaque characters on a translucent, perforated, flexible taps stored within the capsule, and the calendar actuator being operatively connected with an internally illuminated translucent roller over which the tape moves, said roller being illuminated by electrical energy drawn from the clock circuit, and carrying teeth which engage the tape perforations.

References Cited in the file of this patent

UNITED STATES PATENTS

| 66,289 | Boardman | July 2, 1867 |
| 72,930 | Spencer | Dec. 31, 1867 |
| 165,548 | Cowler | July 13, 1875 |

(Other references on following page)

UNITED STATES PATENTS

| | | |
|---|---|---|
| 365,256 | Horton | June 21, 1887 |
| 789,584 | Arp et al. | May 9, 1905 |
| 1,160,898 | Humphreys | Nov. 16, 1915 |
| 1,608,906 | Nedbalik | Nov. 30, 1926 |
| 1,885,830 | Hutchings | Nov. 1, 1932 |
| 2,064,190 | Brenn | Dec. 15, 1936 |
| 2,439,154 | Webb | Apr. 6, 1948 |
| 2,645,868 | Ernst | July 21, 1953 |

FOREIGN PATENTS

| | | |
|---|---|---|
| 18,162 | Great Britain | Jan. 2, 1917 |
| 503,037 | Great Britain | Mar. 30, 1939 |
| 221,352 | Switzerland | Aug. 17, 1942 |
| 497,173 | Belgium | Nov. 16, 1950 |